(12) United States Patent
Lin et al.

(10) Patent No.: US 11,385,530 B2
(45) Date of Patent: Jul. 12, 2022

(54) PROJECTION DISPLAY APPARATUS AND PROJECTING METHOD

(71) Applicant: DELTA ELECTRONICS, INC., Taoyuan (TW)

(72) Inventors: Yu-Nien Lin, Taoyuan (TW); Yi-Chen Tsai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 292 days.

(21) Appl. No.: 16/503,489

(22) Filed: Jul. 4, 2019

(65) Prior Publication Data

US 2020/0272034 A1 Aug. 27, 2020

(30) Foreign Application Priority Data

Feb. 22, 2019 (CN) .......................... 201910133070.7

(51) Int. Cl.
*G03B 21/14* (2006.01)
*H04N 9/31* (2006.01)

(52) U.S. Cl.
CPC ......... *G03B 21/142* (2013.01); *H04N 9/3141* (2013.01); *H04N 9/3188* (2013.01)

(58) Field of Classification Search
CPC .................................................. G03B 21/142
USPC .......................................................... 353/69
See application file for complete search history.

(56) References Cited

U.S. PATENT DOCUMENTS

| 10,460,637 | B2 * | 10/2019 | Ohkoba ................. G09G 3/003 |
| 2005/0168493 | A1 | 8/2005 | Damera-Venkata et al. |
| 2015/0264291 | A1 | 9/2015 | Tani et al. |
| 2016/0337639 | A1 * | 11/2016 | Yang .................... H04N 13/341 |

FOREIGN PATENT DOCUMENTS

| CN | 104614929 A | 5/2015 |
| CN | 106303490 A | 1/2017 |
| CN | 106507075 A | 3/2017 |
| JP | H04-54093 A | 2/1992 |
| JP | H04-113308 A | 4/1992 |
| JP | 2004-258125 A | 9/2004 |
| JP | 2015-194721 A | 11/2015 |
| TW | I556625 B | 11/2016 |

* cited by examiner

*Primary Examiner* — Jerry L Brooks
(74) *Attorney, Agent, or Firm* — CKC & Partners Co., LLC

(57) ABSTRACT

A projecting method includes: outputting, by a projection display apparatus, a projected image to a projection screen through a shifting device, wherein the projected image includes multiple frames; outputting, by a processing circuit, a control signal to drive the shifting device to rotate multiple first angles along a first axis or to rotate multiple second angles along a second axis, wherein combination of the first and the second angles corresponds to multiple projected positions; and when the projection display apparatus outputs multiple frames sequentially, rotating the shifting device sequentially according to the control signal to make multiple frames projected to the corresponding one of projected positions, wherein a number of the first angles or the second angles is at least four.

6 Claims, 16 Drawing Sheets

PROJECTION DISPLAY APPARATUS AND PROJECTING METHOD

RELATED APPLICATIONS

This application claims priority to China Application Serial Number 201910133070.7, filed Feb. 22, 2019, which is herein incorporated by reference.

BACKGROUND

Technical Field

The disclosure relates to a projection display apparatus and a projecting method, particularly to a projection display apparatus improving resolution and a projecting method thereof.

Description of Related Art

With the development of technology, the requirement for projection display apparatus with high resolution is more and more. The high-resolution image provides clear detail and high-quality viewing, and it is useful for user experience and many applications.

However, the resolution of the projection display apparatus is limited in consideration of cost and effectiveness or the size of device, etc. Therefore, how to improve the resolution of the projection display apparatus is one of the important issues in this field.

SUMMARY

One aspect of the present disclosure is a projecting method including: outputting, by a projection display apparatus, a projected image to a projection screen through a shifting device, wherein the projected image includes multiple frames; outputting, by a processing circuit, a control signal to drive the shifting device to rotate multiple first angles along a first axis or to rotate multiple second angles along a second axis, wherein combination of the first and the second angles corresponds to multiple projected positions; and rotating the shifting device sequentially according to the control signal to make multiple frames projected to the corresponding one of projected positions when the projection display apparatus outputs multiple frames sequentially, wherein a number of the first angles or the second angles is at least four.

Another aspect of the present disclosure is a projection display apparatus including a shifting device, an imaging device and a processor. The imaging device is configured to output a plurality of frames to the shifting device. The processor is configured to output a control signal to drive the shifting device to rotate a plurality of first angles along a first axis or to rotate a plurality of second angles along a second axis, so as to make the plurality of frames outputted to a corresponding plurality of projected positions through the shifting device to form a projected image, wherein the resolution of the projected image is larger than the resolution of the plurality of frames, the number of the first angles or the number of the second angles is at least four.

DETAILED DESCRIPTION

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure. The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the diagrams, some of the conventional structures and elements are shown with schematic illustrations.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

In this document, the term "coupled" may also be termed "electrically coupled," and the term "connected" may be termed "electrically connected." "Coupled" and "connected" may also be used to indicate that two or more elements cooperate or interact with each other.

Figure 1:
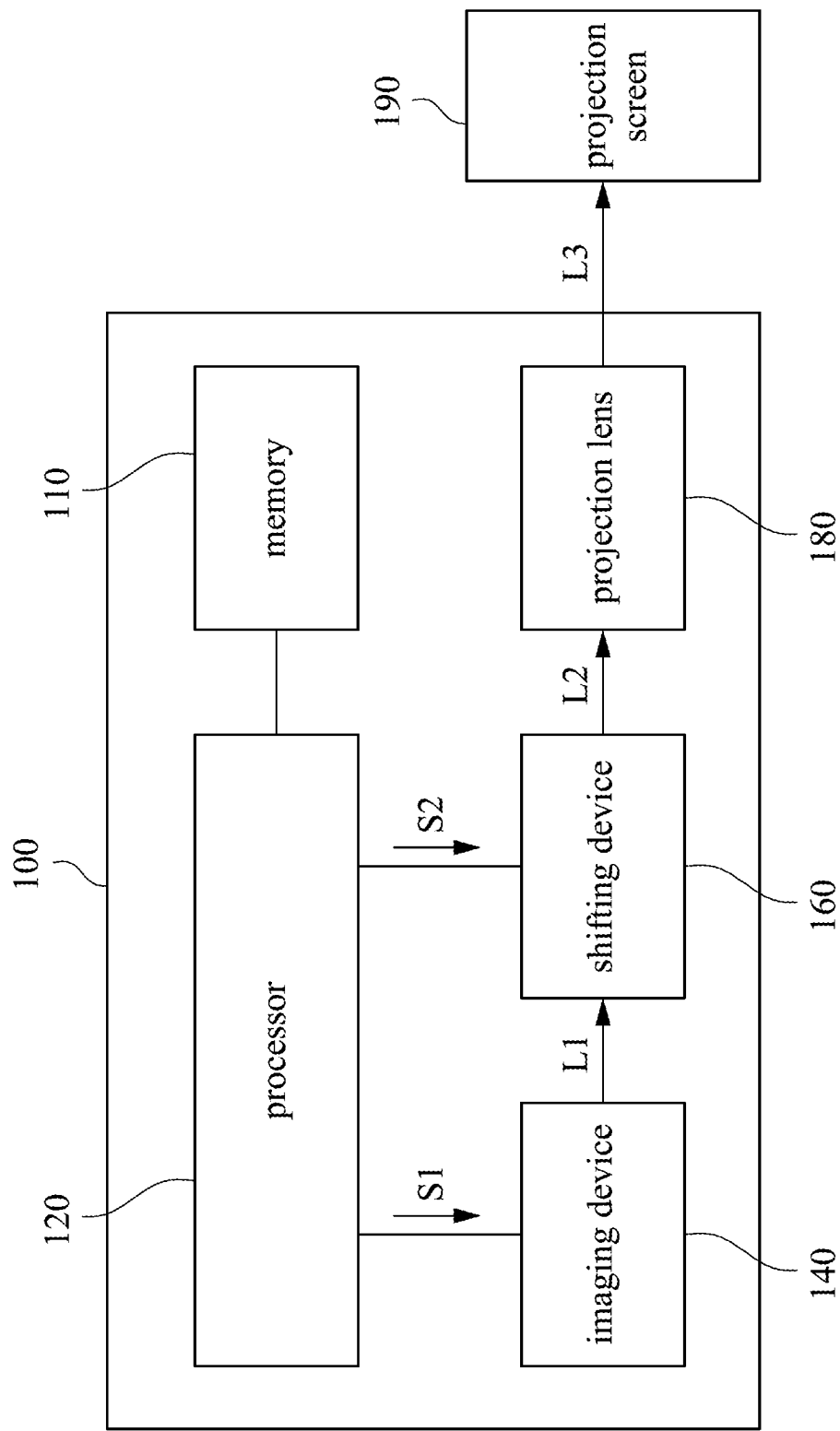
FIG. 1 is a schematic diagram illustrating a projection display apparatus in accordance with some embodiments of the disclosure.

Please refer to FIG. 1. FIG. 1 is a schematic diagram illustrating a projection display apparatus 100 in accordance with some embodiments of the disclosure. As shown in FIG. 1, in some embodiments, the projection display apparatus 100 includes a memory 110, a processor 120, an imaging device 140, a shifting device 160 and a projection lens 180. In structure, the memory 110 is coupled to the processor 120. The processor 120 is coupled to the imaging device 140 and the shifting device 160.

In operation, the memory 110 is configured to store data or signal. The processor 120 is configured to output data signal S1 to the imaging device 140, and output control signal S2 to the shifting device 160. The imaging device 140 is configured to output multiple frames L1 to the shifting device 160 according to the data signal S1. The shifting device 160 is configured to rotate multiple first angles along a first axis and/or rotate multiple second angles along a second axis according to the control signal S2, so as to make the multiple frames L1 outputted to a corresponding multiple projected positions to form a projected image L3. Specifically, the projected image L3 is composed of multiple shifted frames L2. The multiple frames L2 are the multiple frames L1 shifted to the corresponding multiple projected positions. The multiple projected positions are formed according to a combination of multiple first angles and multiple second angles. In other words, the shifting device 160 shifts the multiple frames L1 to the different positions of the projection lens 180 to form the multiple frames L2 according to the first angles and the second angles. The projection lens 180 is configured to project the shifted multiple frames L2 to the projection screen 190 to form projected image L3.

In some embodiments, the projection display apparatus 100 may be a digital TV projector, a digital micro mirror device (DMD), a home projector and a professional projector, etc. In some embodiments, the processor 120 may be realized by a central processing unit (CPU), an application-specific integrated circuit (ASIC), a digital signal processor (DSP), a complex programmable logic device (CPLD), a field-programmable gate array (FPGA), multiprocessor, distributed processing system, or any suitable processor, etc. It should be noted that the processor 120 described above is merely an example, not intended to limit the present disclosure. The various circuits or units used to implement processor 120 are within the scope of the present disclosure.

Figure 2:
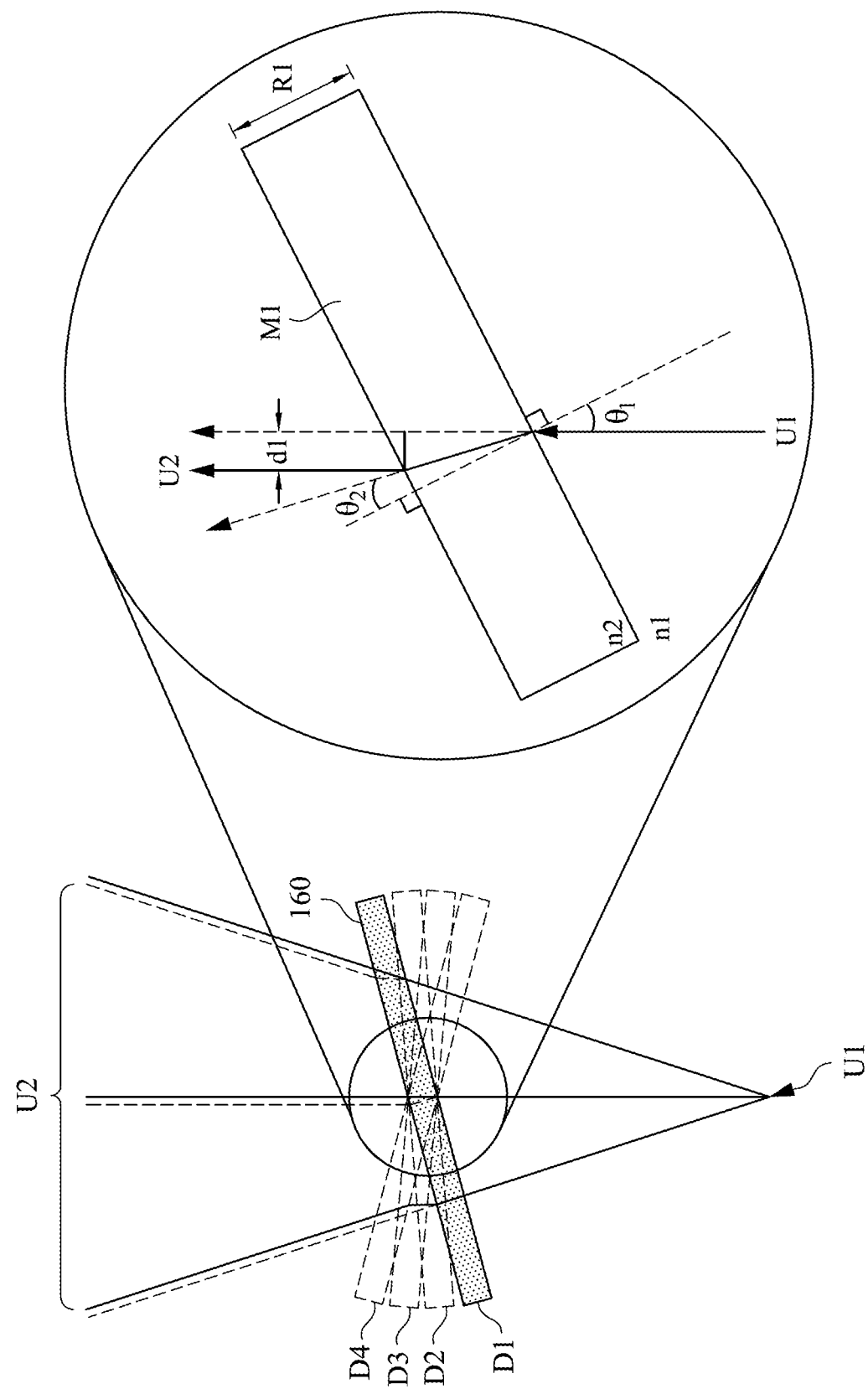
FIG. 2 is a schematic diagram illustrating a shifting device in accordance with some embodiments of the disclosure.

Please refer to FIG. 2. FIG. 2 is a schematic diagram illustrating a shifting device 160 in accordance with some embodiments of the disclosure. As shown in FIG. 2, one of multiple frames L1, U1, through the shifting device 160 forms the corresponding one of multiple frames L2, U2. Specifically, the shifting device 160 rotates to different angles (such as D1, D2, D3, D4 shown in FIG. 2) according to the control signal S2 of the processor 120, so that the light beam U1 is refracted into the light beam U2 at different angles through the shifting device 160.

For example, the shifting device 160 includes a lens M1 with thickness R1, as shown in the magnified schematic of FIG. 2. Due to the refractive index n2 of the lens M1 is different from the refractive index n1 of air, when the light beam U1 is incident from the air into the lens M1 at an incident angle $\theta 1$ and at a refraction angle $\theta 2$, the light beam U2 will be emitted from the lens M1 into the air at an incident angle $\theta 2$ and at a refraction angle $\theta 1$, wherein the shifted distance between the light beam U2 and light beam U1 is d1. When the incident angle $\theta 1$ of the light beam U1 is larger, the shifted distance d1 between the light beam U2 and light beam U1 is larger.

In this way, by adjusting the lens M1 in the shifting device 160 to rotate to different angles to change the incident angle $\theta 1$ of the light beam U1, different magnitudes of the shifted distance d1 is able to be generated, so that the multiple frames L1 forms the multiple frames L2.

Figure 3:
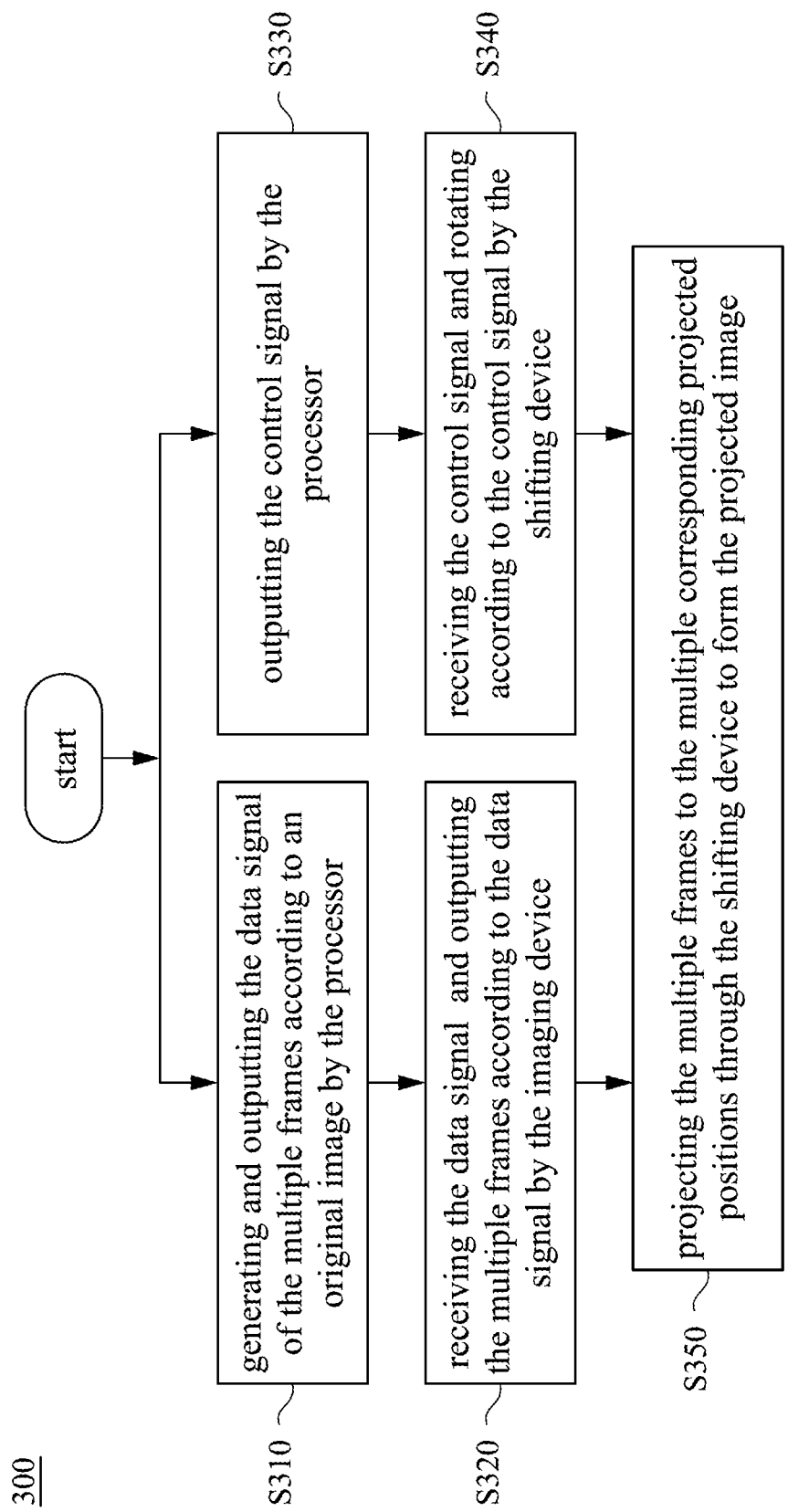
FIG. 3 is a flowchart illustrated a projecting method in accordance with some embodiments of the disclosure.

Further detail description is referred to FIG. 3. FIG. 3 is a flowchart illustrated a projecting method 300 in accordance with some embodiments of the disclosure. For clarify and convenience, the projecting method 300 following are described in accompany with embodiments of FIG. 1~15, but not intended to limit it, various alterations and modifications may be performed on the disclosure by those of ordinary skills in the art without departing from the principle and spirit of the disclosure. As shown in FIG. 3, the projecting method 300 includes operations S310, S320, S330, S340 and S350.

Firstly, in operation S310, generating and outputting the data signal S1 of the multiple frames L1 according to an original image by the processor 120. Specifically, the processor 120 combines the pixel data of the corresponding positions in a plurality of pixel groups in the original image into a corresponding one of the multiple frames L1.

Figure 4:
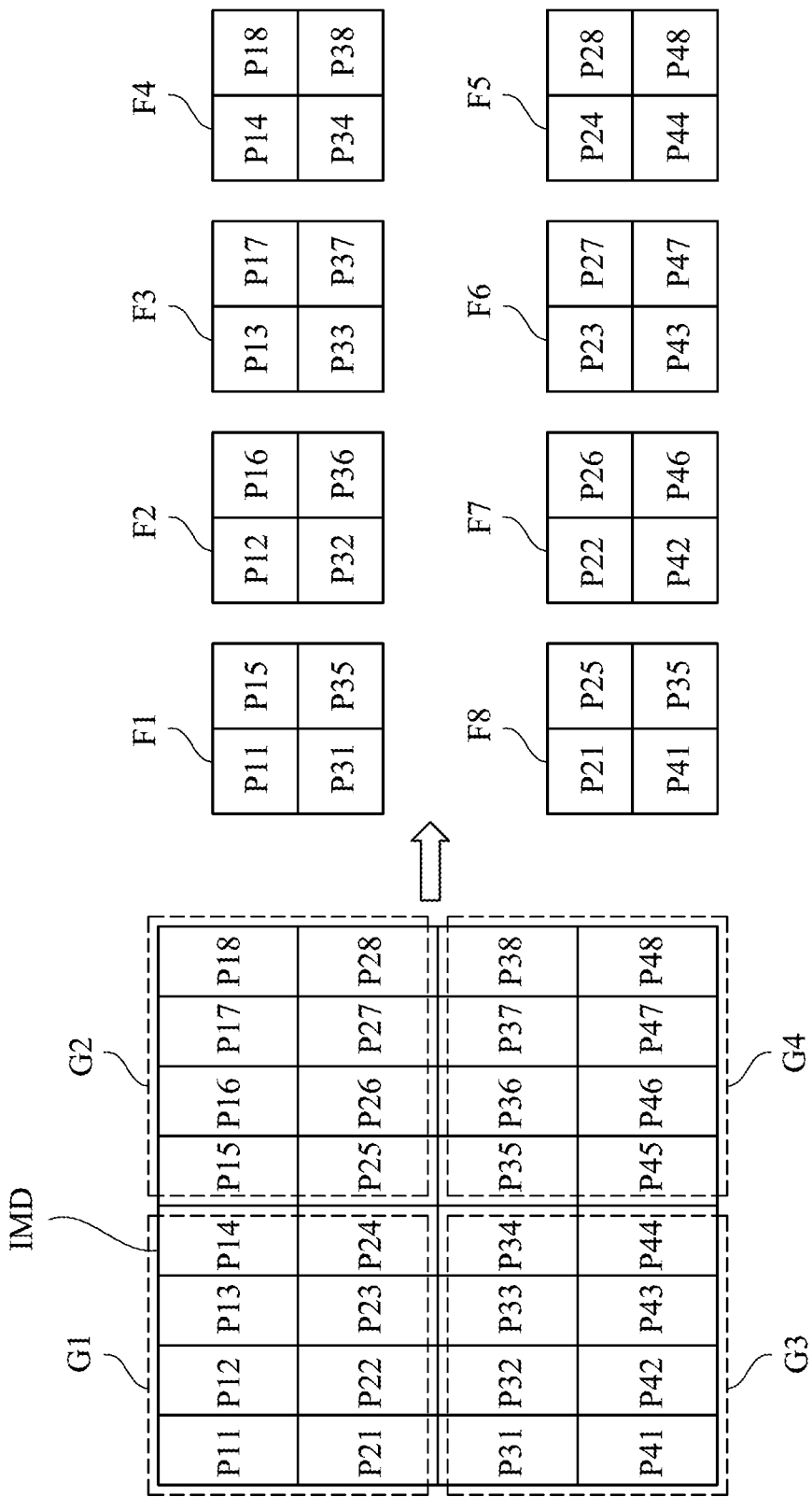
FIG. 4 is a schematic diagram illustrating generating multiple frames in accordance with some embodiments of the disclosure.

For example, please refer to FIG. 4, FIG. 4 is a schematic diagram illustrating generating multiple frames in accordance with some embodiments of the disclosure. In the embodiments of FIG. 4, take the resolution of the original image IMD as 4×8 as an example. The original image IMD includes 32 pixel data P11~P48. The multiple adjacent pixel data in the pixel data P11~P48 are the same group (such as pixel group G1, G2, G3, G4 shown in FIG. 4). The processor 120 combines the first pixel data P11, P15, P31, and P35 respectively located in the uppermost left corner of the pixel group G1, G2, G3, and G4 in the original image IMD into a first frame F1 in the multiple frames L1. The processor 120 combines the second pixel data P12, P16, P32, and P36 respectively located in the second one from the uppermost left corner of the pixel group G1, G2, G3, and G4 in the original image IMD into a second frame F2 in the multiple frames L1.

And so on, the processor 120 combines the pixel data P13, P17, P33, P37 and P14, P18, P34, P38 and P24, P28, P44, P48 and P23, P27, P43, P47 and P22, P26, P42, P46 and P21, P25, P41, P45 respectively located in the corresponding positions of the pixel group G1, G2, G3, and G4 in the original image IMD into the third to the eighth frames F3~F8 in the multiple frames L1. In this way, the processor 120 is able to generate the data signals S1 of the eight frames F1~F8 with the resolution of 2×2 based on the original image IMD with the resolution of 4×8, and output the data signals S1 of the eight frames F1~F8 to the imaging device 140.

It should be noted that the resolution of the original image IMD, the number and size of the pixel data included by the original image IMD are merely example, not intended to limit the disclosure, and may be adjusted based on actual needs by those of ordinary skilled in the art.

Next, in operation S320, receiving the data signal S1 and outputting the multiple frames L1 according to the data signal S1 by the imaging device 140. Specifically, the imaging device 140 receives data signal S1 including multiple frames (as F1~F8 shown in FIG. 4) from the processor 120, and sequentially outputs multiple frames L1 to the shifting device 160 according to the data signal S1.

In addition, in operation S330, outputting the control signal S2 by the processor 120. In operation S340, receiving the control signal S2 and rotating according to the control signal S2 by the shifting device 160. Specifically, the control signal S2 includes a first control signal (as the signal AV shown in FIG. 5) and a second control signal (as the signal AH shown in FIG. 5). The shifting device 160 rotates multiple first angles along the first axis according to the first control signal, and rotates multiple second angles along the second axis according to the second control signal. In some embodiments, the first axis and the second axis are vertical to each other. In some embodiments, the number of the first angles or the number of the second angles is at least four.

Figure 5:
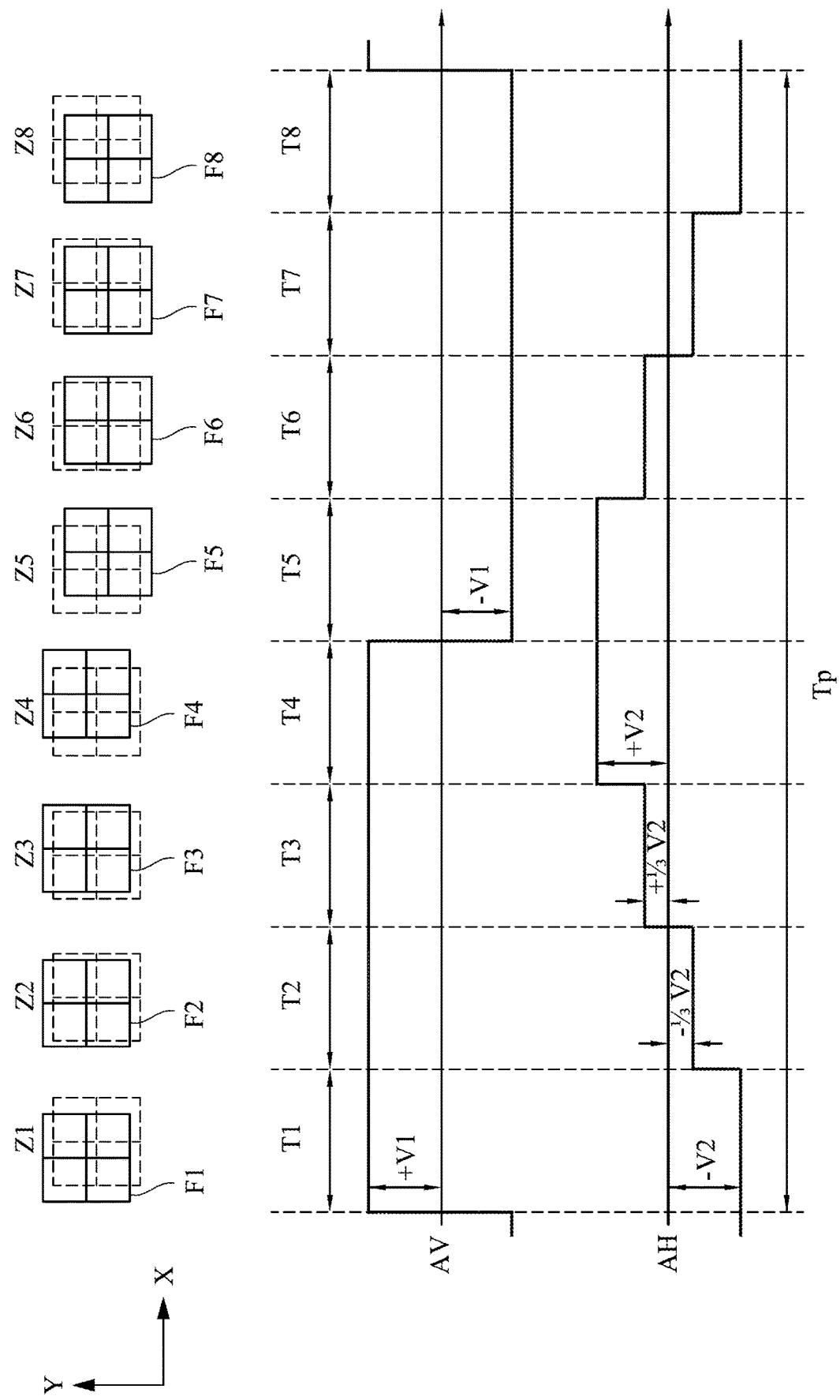
FIG. 5 is a schematic diagram illustrating shifting multiple frames in accordance with some embodiments of the disclosure.

For example, please refer to FIG. 5, FIG. 5 is a schematic diagram illustrating shifting multiple frames L1 in accordance with some embodiments of the disclosure. In the embodiments of FIG. 5, the shifting device 160 rotates two angles along the X axis according to the signal AV including two levels, so that the multiple frames L1 are shifted two positions along the Y axis (as positions Z4, Z5 shown). For example, the first and the second levels of the signal AV are +V1 and −V1, respectively. In addition, the shifting device 160 rotates four angles along the Y axis according to the signal AH including four levels, so that the multiple frames L1 are shifted four positions along X axis (as positions Z1, Z2, Z3, Z4 shown). For example, the first, the second, the third and the fourth levels of the signal AH are −V2, −⅓V2, +⅓V2, and +V2, respectively.

In this way, by the shifting device 160 rotating multiple first angles along the first axis and rotating multiple second angles along the second axis according to the control signal S2, the multiple corresponding projected positions is able to be formed.

Next, in operation S350, projecting the multiple frames L1 to the multiple corresponding projected positions through the shifting device 160 to form the projected image L3. Specifically, the imaging device 140 sequentially outputs the multiple frames L1 (as F1~F8 shown in FIG. 4) through the shifting device 160 to the corresponding multiple projected positions (as Z1~Z8 shown in FIG. 5) to form the multiple frames L2, and the multiple frames L2 is projected through the projection lens 180 to the projection screen 190 to form the projected image L3.

For example, as shown in FIG. 5, in the time period T1, the imaging device 140 outputs the first frame F1, and the first frame F1 is shifted to the projected position Z1 through the shifting device 160. In the time period T2, the imaging device 140 outputs the second frame F2, and the second frame F2 is shifted to the projected position Z2 through the shifting device 160. And so on, in the time period T3~T8, the third to the eighth frames F3~F8 are shifted to the projected positions Z3~Z8 through the shifting device 160 respectively.

Figure 6:
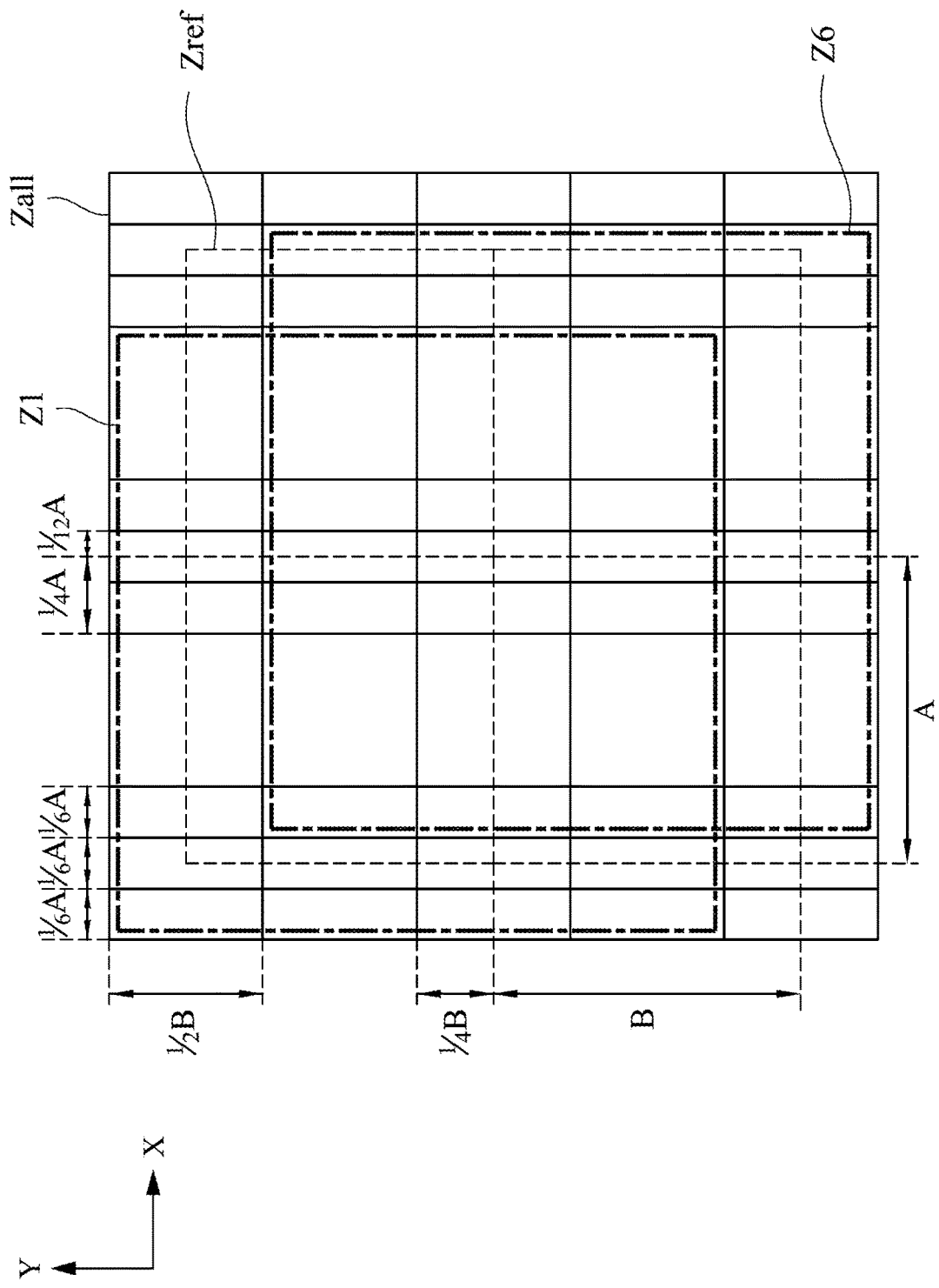
FIG. 6 is a schematic diagram illustrating projected image composed of multiple frames in accordance with some embodiments of the disclosure.

For further detail description, please refer to FIGS. 5 and 6 together. FIG. 6 is a schematic diagram illustrating projected image L3 composed of multiple frames F1~F8 in accordance with some embodiments of the disclosure. In the embodiments of FIG. 6, take the resolution of the multiple frames F1~F8 as 2×2 as example. Zref is the projected position corresponding to the shifting device 160 that is not operated (not shifted). In other words, Zref represents a center reference position of the multiple frames F1~F8. The size of Zref and any one of the multiple frames F1~F8 are the same, of which the length and width of unit pixel are A and B respectively.

In some embodiments, in the time period T1, the shifting device 160 makes the frame F1 shifted ¼B up in the Y direction and shifted ¼A left in the X direction according to the signal AV with the level +V1 and the signal AH with the level −V2 respectively, so that the first frame F1 outputted by the imaging device 140 will be shifted to the projected position Z1 as shown in FIG. 6. For another example, in the time period T6, the shifting device 160 makes the frame F6 shifted ¼B down in the Y direction and shifted 1/12A right in the X direction according to the signal AV with the level −V1 and the signal AH with the level +⅓V2 respectively, so that the sixth frame F6 outputted by the imaging device 140 will be shifted to the projected position Z6 as shown in FIG. 6. And so on, after the time period T1~T8 (i.e., the period Tp that constitutes a complete frame picture), the first to the eighth frames F1~F8 in FIG. 5 will overlap and combine into the projected image L3 as the projected range Zall shown in FIG. 6.

As the embodiments shown in FIG. 6, the projected positions adjacent in the X direction (such as projected positions Z1 and Z2) are different from each other by one-sixth of the unit pixel length A (as ⅙A indicated in FIG. 6). The projected positions adjacent in the Y direction (such as projected positions Z1 and Z8) are different from each other by half of the unit pixel length B (as ½B indicated in FIG. 6). It should be noted that, as the resolution 2×2 as example, the distance between the upper left corner of the pixel in the fourth projected position and the upper right corner of the pixel in the first projected position is half of the unit pixel length A. In other words, no matter four positions are shifted in the X direction or two positions are shifted in the Y direction, the distance between the center and the edge of the projected position (as projected position Z1 shown) farthest from the center reference position Zref is the same. That is, no matter the projected image L3 includes how many frames, the projected range Zall is fixed. That is, all the distances between the center reference position Zref and the projected positions Z1~Z8 are shorter than or equal to the one quarter of unit pixel length A or B.

In this way, by rotating four angles in one axis and rotating two angles in another axis by the shifting device 160, the original image L1 outputted by the imaging device 140 is able to be projected to the corresponding eight projected positions. And by visual persistence caused by human eyes, the multiple frames at the eight projected positions are overlapped and combined into projected image L3. Therefore, the multiple frames with the lower original resolution are able to be projected and generated the projected image with new resolution eight times the original resolution.

It should be noted that, the number of the angles, the amplitude of shifting described above are merely examples, not intended to limit the present disclosure. The embodiments about other angles are described in following.

Figure 7:
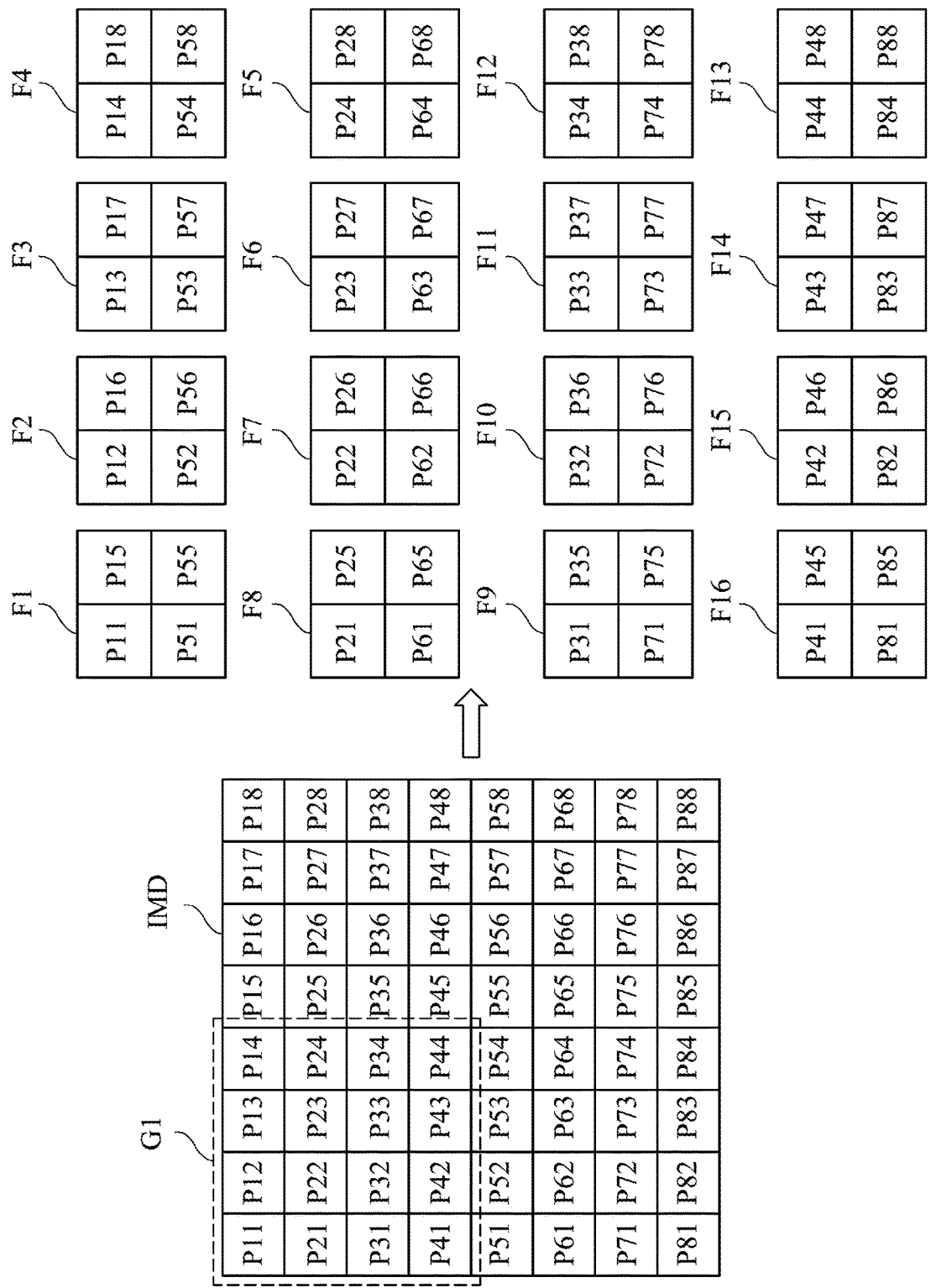
FIG. 7 is a schematic diagram illustrating generating multiple frames in accordance with other embodiments of the disclosure.

Please refer to FIG. 7. FIG. 7 is a schematic diagram illustrating generating multiple frames F1~F16 in accordance with other embodiments of the disclosure. In the embodiments of FIG. 7, the operations described above that are similar to the embodiments of FIG. 4 will be omitted. Compared to FIG. 4, in the present embodiment, the resolution of the original image IMD is 8×8. In other words, the original image IMD includes 64 pixel data P11~P88. The multiple adjacent pixel data in the pixel data P11~P88 are the same group (such as pixel group G1 shown in FIG. 7). The processor 120 combines the pixel data (such as pixel data P11, P15, P51, P55 or P32, P36, P72, P76) respectively located in the corresponding positions of the different pixel groups in the original image IMD into different frames (such as F1 or F10) in the multiple frames L1.

In this way, the processor 120 is able to generate the data signal S1 of sixteen frames F1~F16 with the resolution of 2×2 according to the original image IMD with the resolution of 8×8, and to output the data signal S1 of sixteen frames F1~F16 to the imaging device 140.

Figure 8:
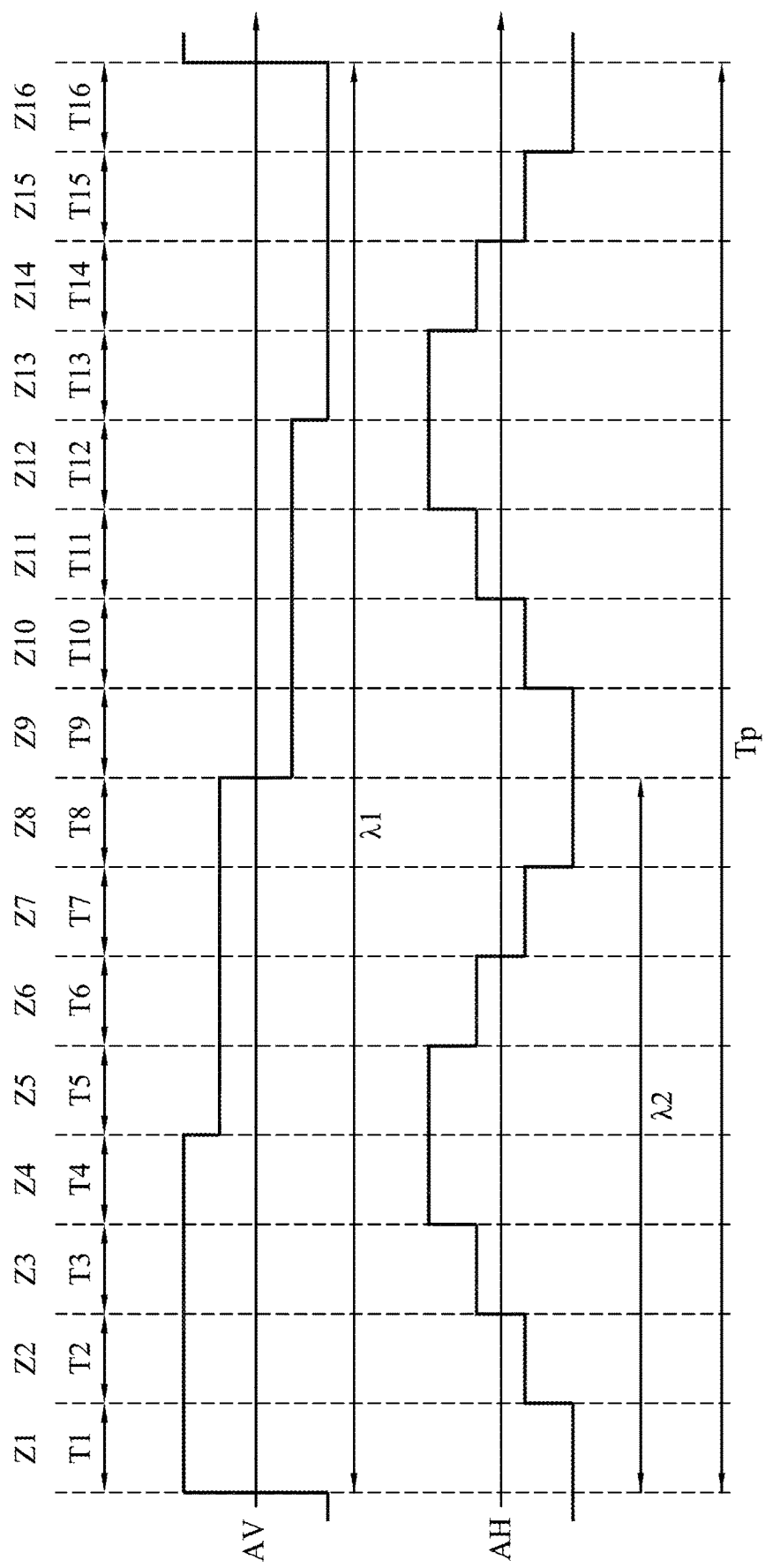
FIG. 8 is a schematic diagram illustrating shifting multiple frames in accordance with other embodiments of the disclosure.
Figure 9:
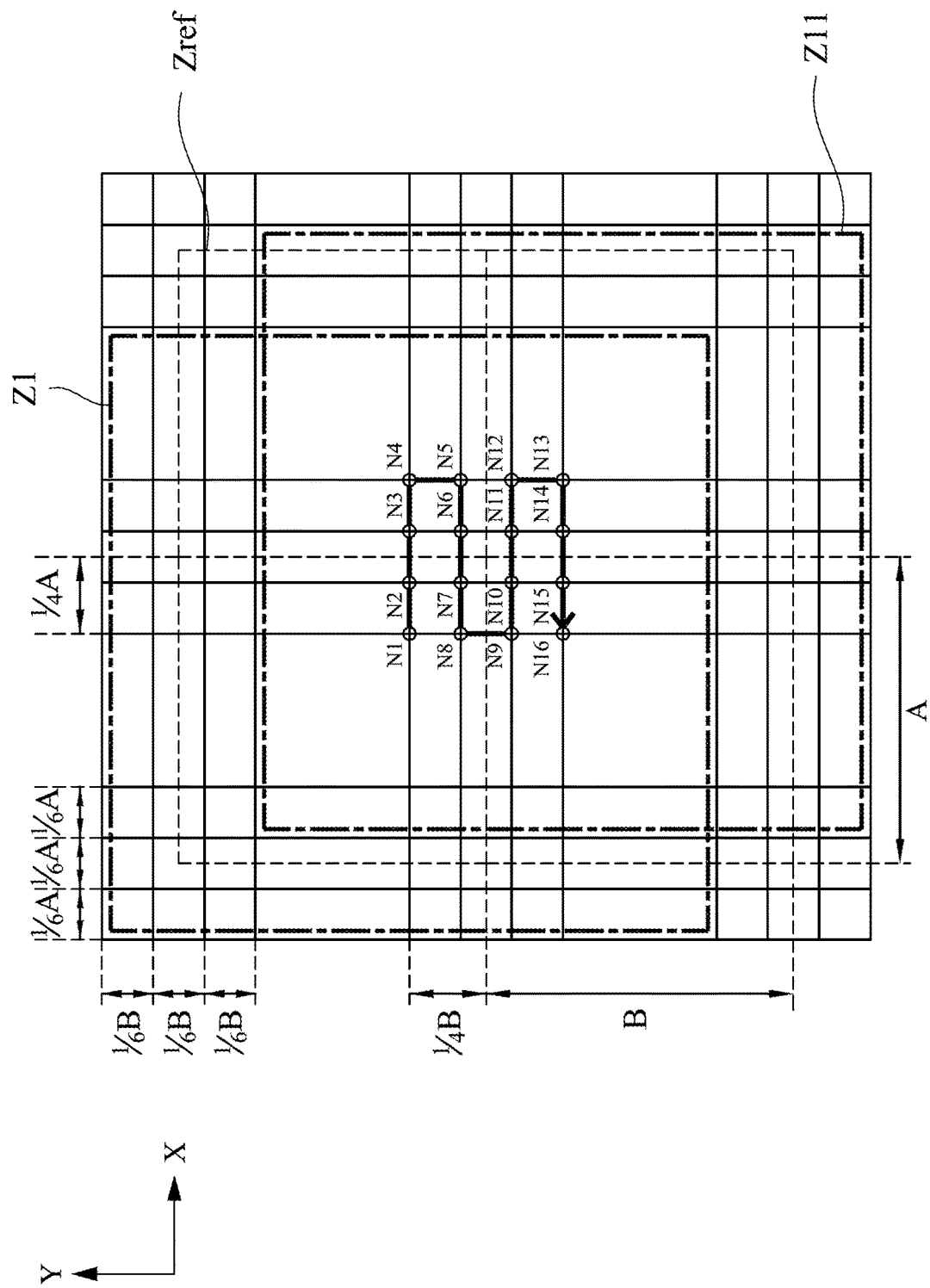
FIG. 9 is a schematic diagram illustrating projected image composed of multiple frames in accordance with other embodiments of the disclosure.

Next, please refer to FIG. 8 and FIG. 9 together. FIG. 8 is a schematic diagram illustrating shifting multiple frames F1~F16 in accordance with other embodiments of the disclosure. FIG. 9 is a schematic diagram illustrating projected image L3 composed of multiple frames F1~F16 in accordance with other embodiments of the disclosure. In the embodiments of FIG. 8 and FIG. 9, compared to the embodiments of FIG. 5 and FIG. 6, the similar operations that are described above will be omitted. In addition, for the sake of clarity and conciseness in the diagram, only the projection positions Z1~Z16 corresponding to the periods T1~T16 are indicated in FIG. 8, and In FIG. 9, the center point positions N1~N16 included in the projection positions Z1~Z16 represent the positions of the projection positions Z1~Z16, and the directions in which the projection positions Z1~Z16 shift are indicated by arrows.

Compared to FIG. 5 and FIG. 6, in the present embodiment, the shifting device 160 rotates four angles in X axis according to signal AV including four levels, so that the multiple frames L1 are shifted four positions in Y direction (such as the projected positions Z1, Z5, Z9 and Z13 corresponding to the time periods T1, T5, T9 and T13). Furthermore, the shifting device 160 rotates four angles in Y axis according to the signal AH including four levels, so that the multiple frames L1 are shifted four positions in X direction (such as the projected positions Z1, Z2, Z3 and Z4 corresponding to the time periods T1, T2, T3 and T4). In other words, the shifting device 160 rotates the four first angles along the first axis and rotates the four second angles along the second axis according to the control signal S2, so that the corresponding sixteen projected positions Z1~Z16 are formed.

In the present embodiment, the period Tp constituting a complete frame picture includes the time periods T1~T16. In the time periods T1~T16, the imaging device 140 sequentially outputs multiple frames (such as F1~F16 shown in FIG. 7) through the shifting device 160 to shift to the corresponding multiple projected positions (such as N1~N16 shown in FIG. 9) to form multiple frames L2, and the multiple frames L2 are projected to the projection screen 190 through the projection lens 180 to form projected image L3.

For example, in time period T1, the first frame F1 outputted by the imaging device 140 is shifted to the projected position Z1 (the center point located at N1) as shown in FIG. 9 through the shifting device 160. In time period T11, the eleventh frame F11 outputted by the imaging device 140 is shifted to the projected position Z11 (the center point located at N11) as shown in FIG. 9 through the shifting device 160.

In addition, in the embodiments of FIG. 9, compared to the embodiments of FIG. 6, the projected positions adjacent in the Y direction (such as projected positions N1 and N8) are different from each other by one-sixth of the unit pixel length B (as ⅙B indicated in FIG. 9). And, as the resolution 2×2 as example, the distance between the upper left corner of the pixel in the sixteenth projected position and the lower left corner of the pixel in the first projected position is half of the unit pixel length B. In other words, no matter two or four positions are shifted in the Y direction, the distance between the center and the edge of the projected position farthest from the center reference position Zref is the same (e.g., the distance between the projected position Z1 and the center reference position Zref of FIG. 6 is equal to the distance between the projected position Z1 and the center reference position Zref of FIG. 9). That is, no matter the projected image L3 includes how many frames, the projected range Zall is fixed.

Furthermore, as shown in FIG. 8, in some embodiments, the wavelength $\lambda 1$ of the square signal AV is about twice the wavelength $\lambda 2$ of the square signal AH (that is, the frequency of the square signal AH is about twice the frequency of the square signal AV), the shifting device 160 rotates the first angles along the first axis according to the square signal AV and rotates the second angles along the second axis according to the square signal AH, so that the projected positions Z1~Z16 will be shifted with S type as shown in FIG. 9. It should be noted that, when the length of each period is shorter, the square wave signal will approximate the triangular wave signal.

Figure 10:
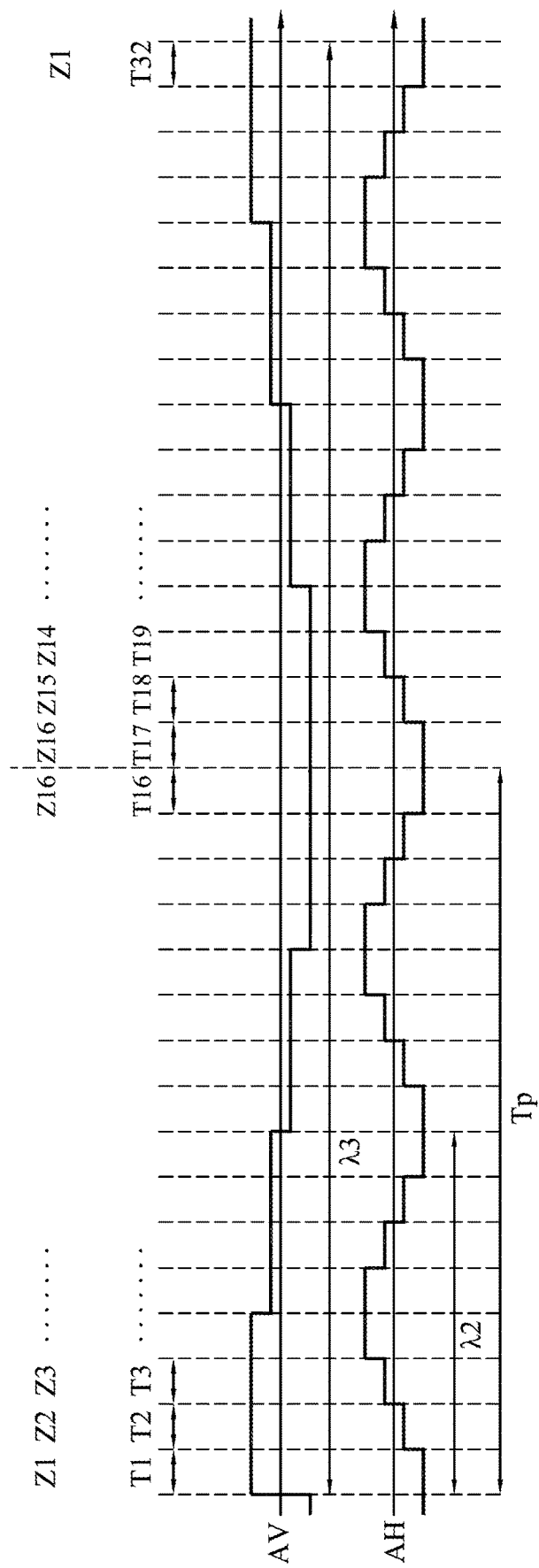
FIG. 10 is a schematic diagram illustrating shifting multiple frames in accordance with other embodiments of the disclosure.

In other embodiments, as shown in FIG. 10, the wavelength $\lambda 3$ of the square signal AV is four times the wavelength $\lambda 2$ of the square signal AH (that is, the frequency of the square signal AH is about four times the frequency of the square signal AV). In time periods T1~T16, similar to the embodiments of FIG. 9, the projected positions Z1~Z16 are shifted with S type. And in time periods T17~T32, different from the embodiments of FIG. 9, the projected positions are shifted backwards with S type. In other words, as indicated in FIG. 10, the projected positions corresponds to the time periods T17~T32 are Z16~Z1. Specifically, the corresponding pixel data of the image included by the projected positions Z16~Z1 corresponding to the time periods T17~T32 are as multiple frames F16~F1 shown in FIG. 7.

Figure 11:
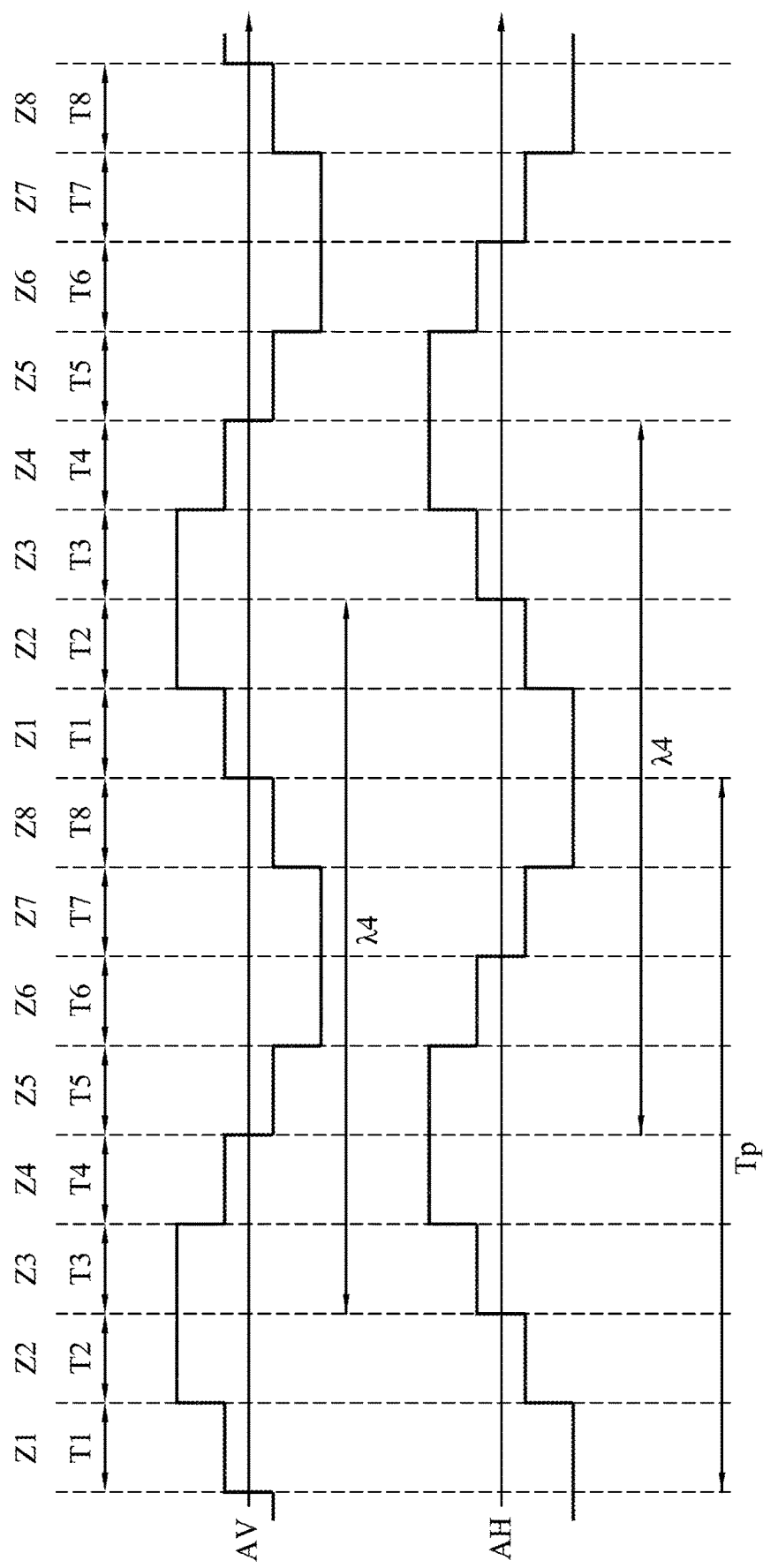
FIG. 11 is a schematic diagram illustrating shifting multiple frames in accordance with other embodiments of the disclosure.
Figure 12:
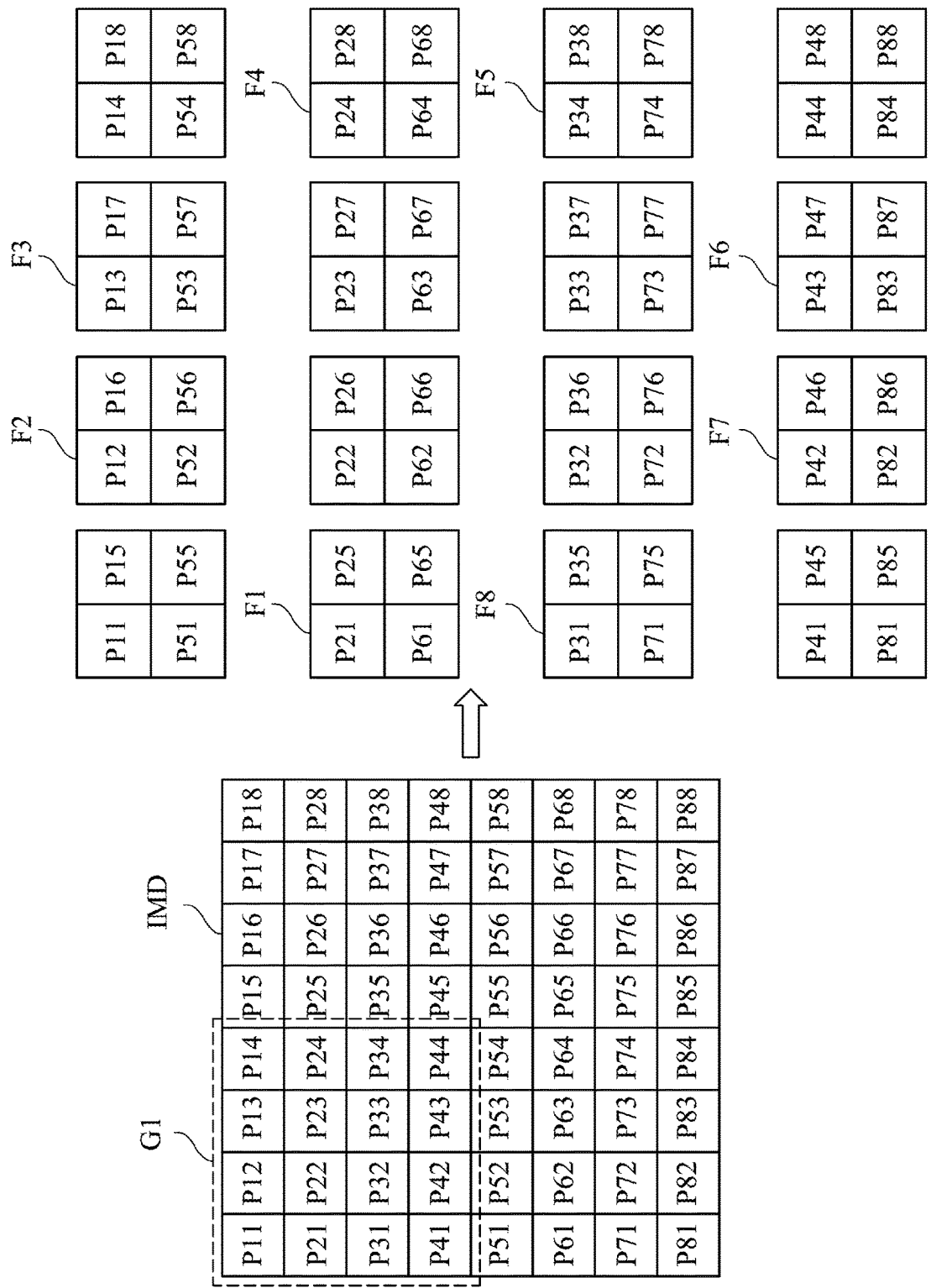
FIG. 12 is a schematic diagram illustrating generating multiple frames in accordance with other embodiments of the disclosure.

In addition, in other embodiments, as shown in FIG. 11, the control signal includes two signals AV, AH with the same wavelength of $\lambda 4$ and a phase difference of 90 degrees. In the present embodiment, the period Tp constituting a complete frame picture includes the time periods T1~T8. In the time periods T1~T8, the imaging device 140 sequentially outputs multiple frames, such as F1~F8 shown in FIG. 12. The multiple frames F1~F8 are shifted through the shifting device 160 to the corresponding multiple projected positions (such as N1~N8 shown in FIG. 13) to form multiple frames L2. The projection lens 180 is configured to project the shifted multiple frames L2 to the projection screen 190 to form projected image L3.

Figure 13:
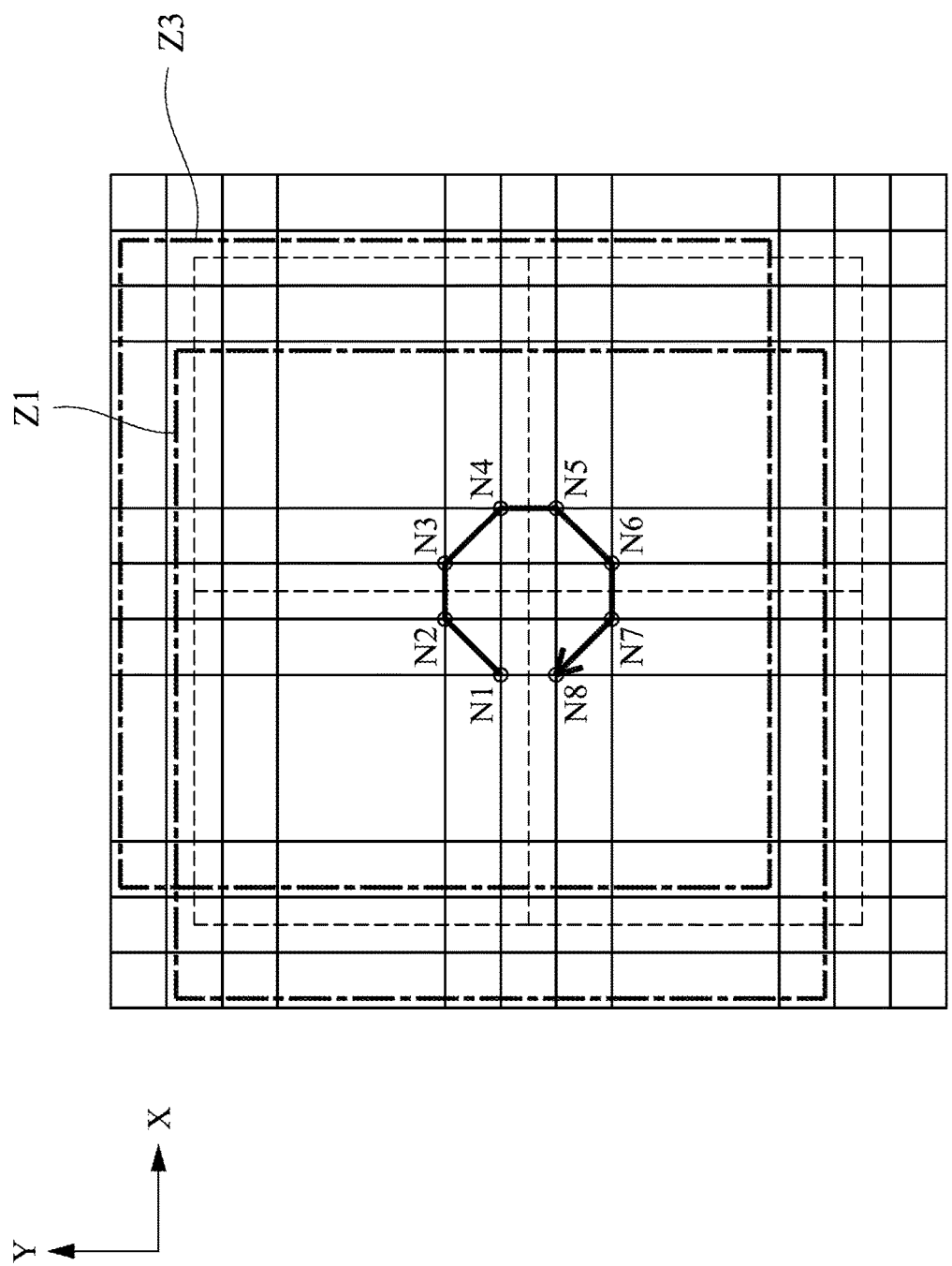
FIG. 13 is a schematic diagram illustrating projected image composed of multiple frames in accordance with other embodiments of the disclosure.
Figure 14:
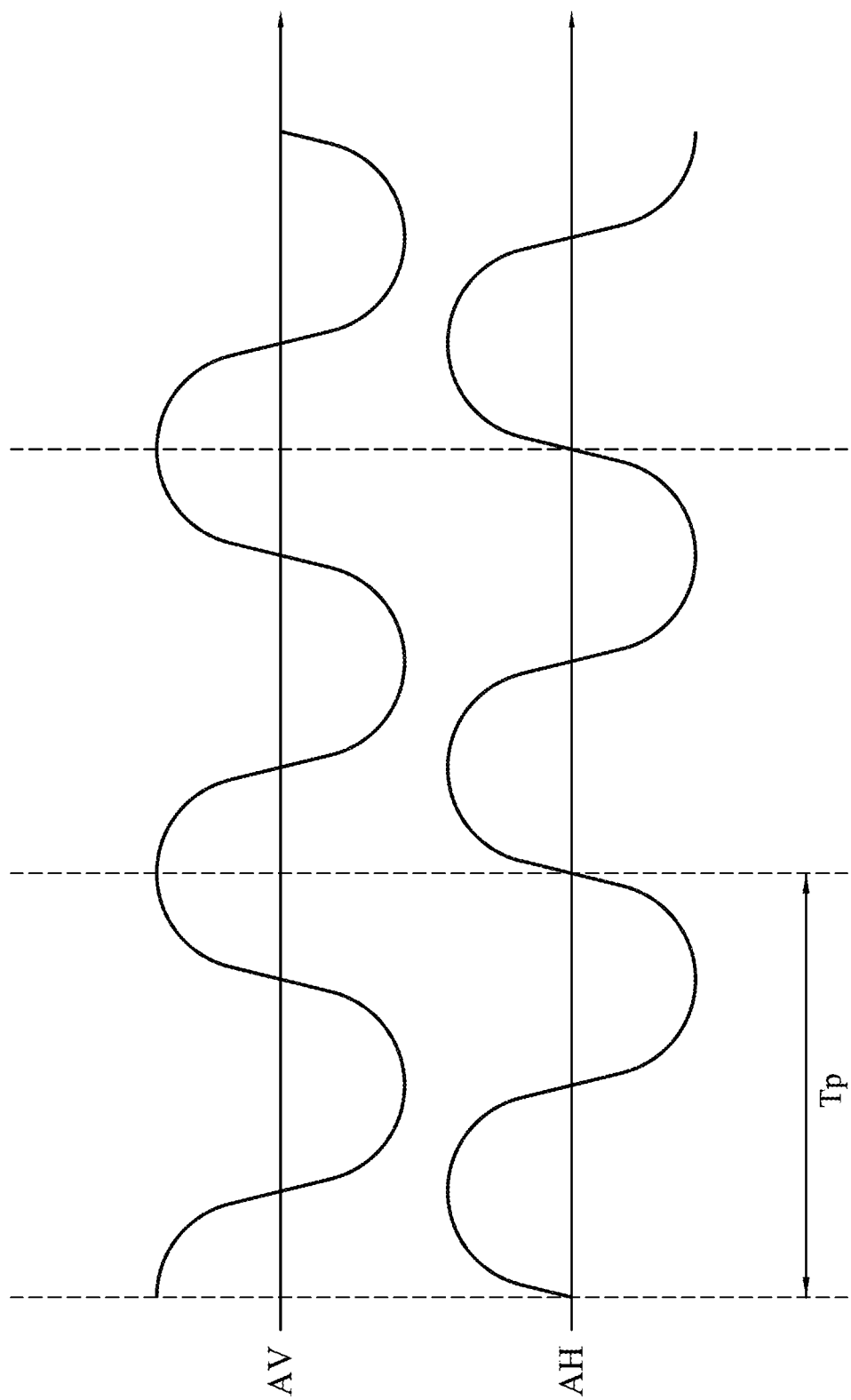
FIG. 14 is a schematic diagram illustrated control signals in accordance with some embodiments of the disclosure.

For example, in time period T1, the first frame F1 outputted by the imaging device 140 is shifted to the projected position Z1 (the center point located at N1) as shown in FIG. 13 through the shifting device 160. In time period T3, the eleventh frame F11 outputted by the imaging device 140 is shifted to the projected position Z3 (the center point located at N3) as shown in FIG. 13 through the shifting device 160.

It should be noted that, because the shifting device 160 is rotated according to the control signal S2 to form the corresponding projection positions, the shifting device 160 is able to be controlled to rotate to more fine angles, so as to form more projection positions by adjusting the amplitude of the control signal S2 during each time period. In other words, by assigning the pixel data in one period Tp constituting a complete frame picture to more multiple frames, and by matching the corresponding control signals (for example, the sine wave signals AV, AH shown in FIG. 14), the projection image L3 outputted by the projection display apparatus 100 is able to reach a higher resolution effect than the native resolution.

Figure 15:
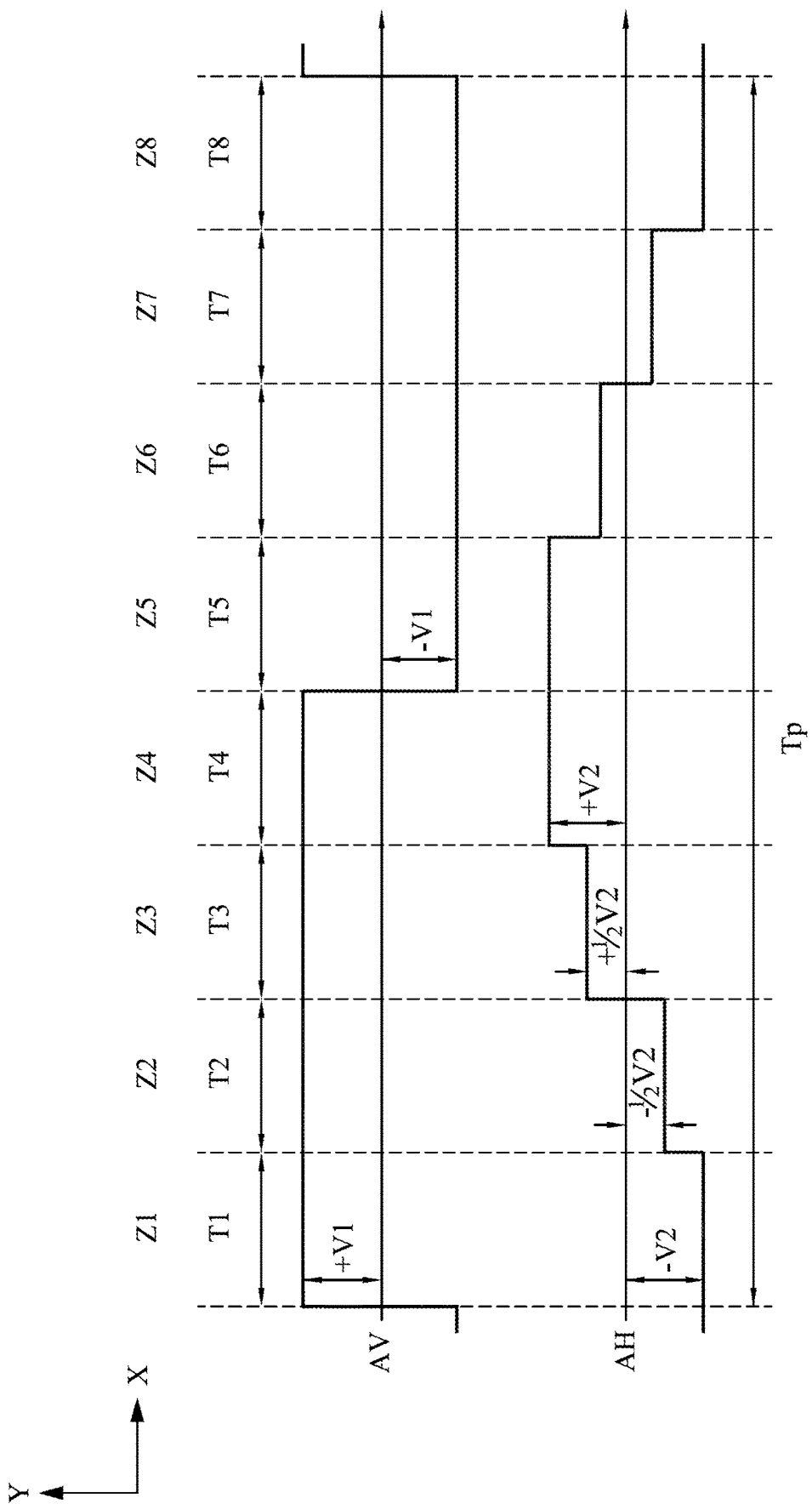
FIG. 15 is a schematic diagram illustrating shifting multiple frames in accordance with other embodiments of the disclosure.
Figure 16:
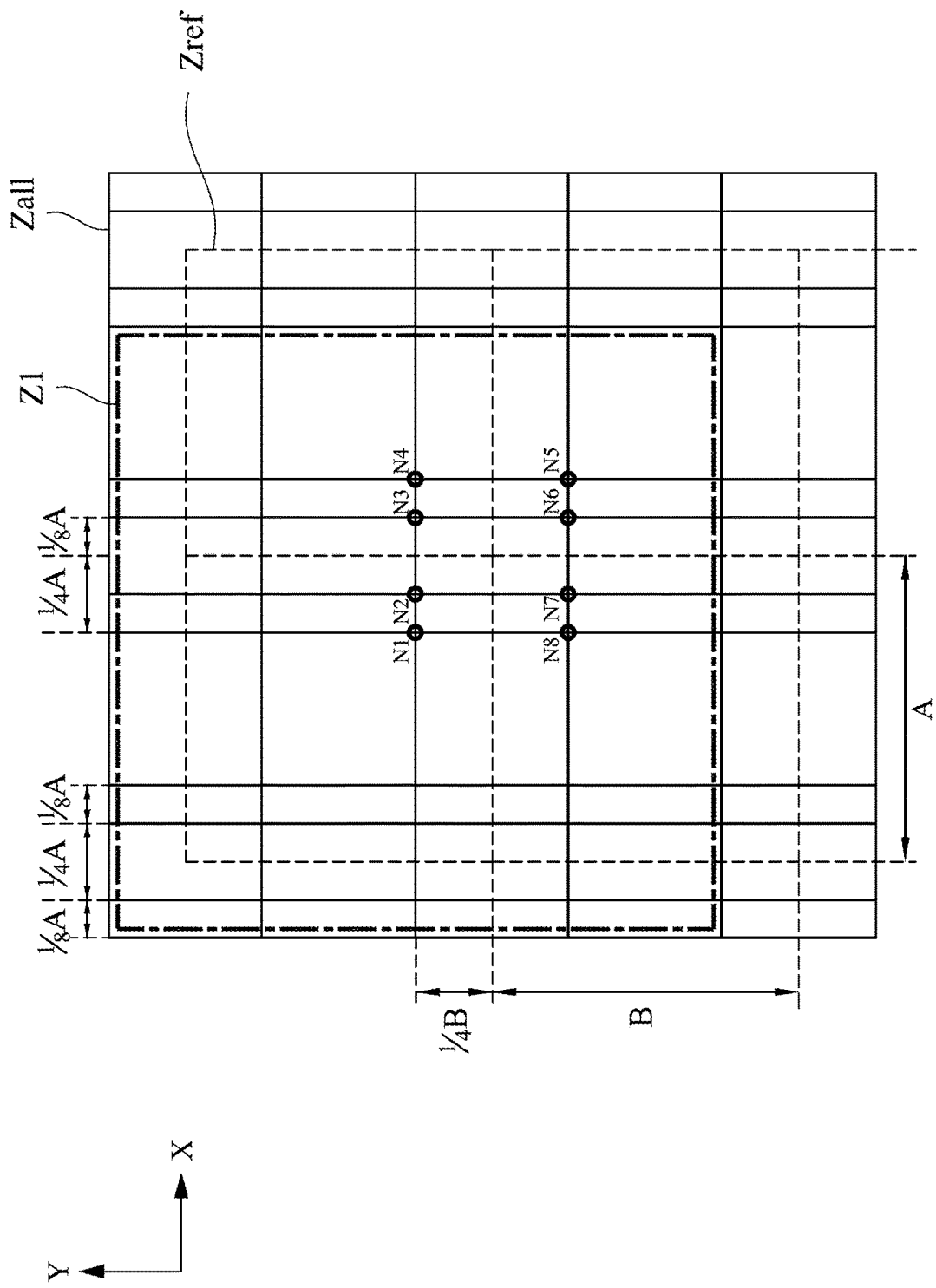
FIG. 16 is a schematic diagram illustrating shifting multiple frames in accordance with other embodiments of the disclosure.

In addition, in other embodiments, the distance between the adjacent projected positions may not be completely the same. Specifically, please refer to FIG. 15 and FIG. 16. In the embodiments of FIG. 15 and FIG. 16, the operations similar to the embodiments of FIG. 5 and FIG. 6 and described above will be omitted. Compared to FIG. 5 and FIG. 6, in the present embodiment, the first, second, third and fourth level of the signal AH are $-V2$, $-\frac{1}{2}V2$, $+\frac{1}{2}V2$ and $+V2$, respectively. In other words, the magnitude of the angle at which the shifting device 160 rotates each time along the Y axis according to the signal AH is not completely the same. That is to say, the distance at which the multiple frames L1 are shifted each time in the X direction is not completely the same.

Further description, in FIG. 16, for the sake of clarity and conciseness of the diagram, the positions of the projection positions Z1~Z8 are represented by the center point positions N1~N8 of the projection positions Z1~Z8. In the time period T1, the shifting device 160 makes the frame F1 shifted ¼B up in the Y direction and shifted ¼A left in the X direction according to the signal AV with the level $+V1$ and the signal AH with the level $-V2$ respectively. In the time period T3, the shifting device 160 makes the frame F1 shifted ¼B up in the Y direction and shifted ⅛A right in the X direction according to the signal AV with the level $+V1$ and the signal AH with the level $+\frac{1}{2}V2$ respectively.

For example, as shown in FIG. 16, the projected positions Z1 and Z2 are different from each other by one-eighth of the unit pixel length A (as ⅛A indicated in FIG. 16). The projected positions Z2 and Z3 are different from each other by one quarter of the unit pixel length A (as ¼A indicated in FIG. 16). The projected positions Z3 and Z4 are different from each other by one-eighth of the unit pixel length A. This shows that the spacing between adjacent projection positions is not completely the same.

The above projecting method 300 is described in accompanying with the signal AV and AH shown in the embodiments above, but not limited thereto. Various alterations and modifications may be performed on the disclosure by those of ordinary skilled in the art without departing from the principle and spirit of the disclosure.

In the foregoing, exemplary operations are included. However, these operations do not need to be performed sequentially. The operations mentioned in the embodiment may be adjusted according to actual needs unless the order is specifically stated, and may even be performed simultaneously or partially simultaneously.

It is noted that, the drawings, the embodiments, and the features and circuits in the various embodiments may be combined with each other as long as no contradiction appears. The circuits illustrated in the drawings are merely examples and simplified for the simplicity and the ease of understanding, but not meant to limit the present disclosure. In addition, those skilled in the art can understand that in various embodiments, circuit units may be implemented by different types of analog or digital circuits or by different chips having integrated circuits. Components may also be integrated in a single chip having integrated circuits. The description above is merely by examples and not meant to limit the present disclosure.

In summary, in various embodiments of the present disclosure, the shifting device 160 rotates to different angles according to the control signal S2, so that the multiple frames are able to be superimposed by the human eye to form a higher resolution projection image, thereby achieving the effect of increasing the resolution of the native image.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A projecting method, comprising:
   outputting, by a projection display apparatus, a projected image to a projection screen through a shifting device, wherein the projected image includes a plurality of frames;
   outputting, by a processing circuit, a control signal to drive the shifting device to rotate a plurality of first angles along a first axis and to rotate a plurality of second angles along a second axis perpendicular to the first axis, wherein combination of the first and the second angles corresponds to a plurality of projected positions; and
   rotating the shifting device sequentially according to the control signal to make the plurality of frames projected to the corresponding one of projected positions when the projection display apparatus outputs the plurality of frames sequentially, wherein a number of the first angles or a number of the second angles is at least four, and the number of the first angles and the number of the second angles are different;
   wherein the shifting device rotates along the first axis according to a first square wave of the control signal, and rotates along the second axis according to a second square wave of the control signal, wherein the frequency of the first square wave is twice or four times the frequency of the second square wave.

2. The projecting method of claim 1, wherein the resolution of the plurality of frames is lower than the resolution of the projected image.

3. The projecting method of claim 1, wherein the plurality of frames comprises an unit pixel, the distance between a reference position and the projected positions are shorter than or equal to one quarter of the length of the unit pixel.

4. The projecting method of claim 1, wherein the distances between any two adjacent projected positions are the same.

5. The projecting method of claim 1, wherein the distances between any two adjacent projected positions are different.

6. A projection display apparatus, comprising:
   a shifting device;
   an imaging device, configured to output a plurality of frames to the shifting device; and
   a processor, configured to output a control signal to drive the shifting device to rotate a plurality of first angles along a first axis and to rotate a plurality of second angles along a second axis perpendicular to the first axis, so as to make the plurality of frames outputted to a corresponding plurality of projected positions through the shifting device to form a projected image, wherein the resolution of the projected image is larger than the resolution of the plurality of frames, a number of the first angles or a number of the second angles is at least four, and the number of the first angles and the number of the second angles are different;

wherein the shifting device rotates along the first axis according to a first square wave of the control signal, and rotates along the second axis according to a second square wave of the control signal, wherein the frequency of the first square wave is twice or four times the frequency of the second square wave.

\* \* \* \* \*